United States Patent [19]

Truskolaski et al.

[11] Patent Number: 4,983,664

[45] Date of Patent: Jan. 8, 1991

[54] INK FOR DIRECTLY PRINTABLE TAPE BEARING RELEASE COATING

[75] Inventors: Bernard S. Truskolaski, Lake Elmo; Daniel P. Pohl, Grant Township, Washington County, both of Minn.

[73] Assignee: Minnesota Mining and Manufacturing Company, St. Paul, Minn.

[21] Appl. No.: 806,380

[22] Filed: Dec. 9, 1985

Related U.S. Application Data

[62] Division of Ser. No. 694,082, Jan. 23, 1985, Pat. No. 4,599,620.

[51] Int. Cl.$^5$ .............................................. C09D 11/10
[52] U.S. Cl. ...................................... 524/514; 524/35; 106/20
[58] Field of Search ...................... 106/20; 524/514, 35

[56] References Cited

U.S. PATENT DOCUMENTS

| | | | |
|---|---|---|---|
| 2,532,011 | 11/1950 | Dahlquist et al. | 428/40 |
| 2,607,711 | 8/1952 | Hendricks | 428/40 |
| 3,239,478 | 3/1966 | Harlan, Jr. | 428/355 X |
| 3,318,852 | 5/1967 | Dixon | 428/341 |
| 3,681,105 | 8/1972 | Milutin et al. | 117/15 |

FOREIGN PATENT DOCUMENTS

| | | | |
|---|---|---|---|
| 2541299 | 8/1984 | France | |
| 2140439 | 11/1984 | United Kingdom | 428/352 |

OTHER PUBLICATIONS

*Kirk–Othmer Encyclopedia of Chemical Technology,* Third Edition, vol. 13, New York, John Wiley & Sons, 1981, pp. 390–391.
Kodak Publication No. GN-350, Jul. 1983.
Kodak Publication No. GN-355, Nov. 1983.
Toyo Kasei Kogyo Co. Ltd., Hardlen Publication (undated).

*Primary Examiner*—Evan Lawrence
*Attorney, Agent, or Firm*—Donald M. Sell; Walter N. Kirn; Robert H. Jordan

[57] ABSTRACT

An ink composition comprising a resinous binder comprising a polyamide, a coloring agent, a chlorinated polyolefin and a solvent, with the chlorinated polyolefin comprising from about 3 to about 12 weight percent of the composition. The ink composition is suitable for printing on the low adhesion backsize coating of a pressure-sensitive adhesive tape.

4 Claims, No Drawings

INK FOR DIRECTLY PRINTABLE TAPE BEARING RELEASE COATING

This is a division of application Ser. No. 694,082 filed Jan. 23, 1985, now U.S. Pat. No. 4,599,620.

BACKGROUND OF THE INVENTION

This invention relates to directly printable tapes, inks for printing upon said tapes, and a method for printing upon said tapes.

Adhesive tapes with printed indicia on the back side, i.e., the side opposite that bearing adhesive are useful for advertising and identification functions. As a practical matter, the adhesive is generally a pressure-sensitive adhesive. Inasmuch as pressure-sensitive adhesive tapes are those in which the adhesive has sufficient adhesion and tack to adhere to adherent surfaces with light finger pressure, the tapes are generally coated on the back side with a release agent. Such a coating permits the tape to be unwound easily in roll form without transfer of the adhesive to the back side of the tape. Thus, with printable pressure-sensitive adhesive tapes, the ink must adhere to the release coating, which is often called a "backsize", and not be removed by the adhesive in contact therewith.

Early attempts to provide printed pressure-sensitive adhesive tapes involved a process known as the "print seal process". In this process, the back side of the tape is printed with indicia, dried, and immediately overprinted with a release agent and dried before the adhesive surface contacts the printed indicia. Although this process produces a satisfactory tape when properly carried out, it requires a special printing machine with at least two printing and drying operations, making it inconvenient, expensive, and frequently variable in result.

A number of attempts have been made to provide printable, pressure-sensitive adhesive tapes which do not require overprinting. It has been particularly difficult to find a release agent capable of sufficiently retaining the printed indicia against the adhesive action of high performance or high adhesion adhesives, especially those based on block copolymer elastomers. Thus, it is desirable to provide a release coating composition which when employed with such block copolymer-based pressure-sensitive adhesives will impart to tapes the property of ready release and good printability without adversely affecting adhesion and tack of the adhesive. It is further desirable to provide a release coating composition capable of forming a coating which is resistant to splitting and to loss of desirable properties on aging.

Current packaging tapes are required to achieve a level of performance which imposes drastic constraints on those tapes, which must of necessity be printable and carry a sharp, clear imprinted message from the tape roll to the surface upon which the tape is to be applied. Commercial distribution of printable packaging tapes requires that the tape be shipped to a converter who applies the printed indicia, in turn selling the printed tape in dispensable roll form to the ultimate customer. At this stage, the tape may be subjected to reasonably lengthy periods of storage at conventional warehousing conditions including moderately elevated temperatures. During this time, the highly aggressive pressure-sensitive adhesive is in direct contact with the underlying printed surface, which may result in offsetting of the ink to the adhesive layer when the tape is ultimately dispensed from the roll.

The means for insuring sufficient anchorage of the printed matter to prevent this ink transfer, and the means for promoting satisfactory release of the adhesive layer from the backsize when the tape is in roll form are in essence diametrically opposed. Prior art attempts to balance these opposing forces have been accomplished only by cumbersome processing steps which complicate the production of such tapes and increase the expense thereof.

Attempts have also been made to modify commercially available inks for use with low adhesion backsize-coated pressure-sensitive adhesive tapes by the addition of natural or synthetic waxy materials, but such attempts have been unsatisfactory because such additives tend to migrate into the adhesive layer and cause a variety of deficiencies such as detackification and loss in adhesive and cohesive strength.

SUMMARY OF THE INVENTION

In one aspect of this invention, there is provided a tape comprising a polymeric film backing having (1) a backsize coating on one major surface thereof, the backsize coating comprising a mixture of at least one low adhesion backsize compound, e.g. a polyvinyl carbamate polymer wherein the carbamate side chains terminate with an alkyl group of more than five carbon atoms, and an ink adhesion promoter, e.g. a chlorinated polyolefin, and (2) a pressure-sensitive adhesive on the other major surface thereof.

In another aspect, there is provided an ink capable of printing on the backsize coating of the previously described pressure-sensitive adhesive web. This ink makes possible winding and unwinding the printed web in normal fashion without transfer of ink from the printed surface to the adjacent pressure-sensitive adhesive. The ink comprises a conventional flexographic ink composition in conjunction with an effective amout of a chlorinated polyolefin. Preferably, the ink contains from about 15 to about 35 weight percent, and preferably from about 15 to about 30 weight percent of a resinous binder; from about 5 to about 15 weight percent, and preferably from about 6 to about 7 weight percent, of a coloring agent which can be inorganic or organic; from about 3 to about 12 weight percent, and preferably from about 4 to about 5 weight percent, of a chlorinated polyolefin, and from about 55 to about 75 weight percent, and preferably from about 60 to about 70 weight percent, of a solvent for flexographic ink. Additional ingredients such as conventional ink modifiers can be added as necessary.

In a third aspect of this invention, there is provided a method for applying ink to the directly printable tape. This method involves heating the tape to a temperature sufficiently high to soften the low adhesion backsize coating, but not so high as to distort the polymeric backing or to degrade the adhesive during the period of application of ink to the tape.

The pressure-sensitive adhesive tape of this invention is directly printable. As used herein, the term "directly printable" means capable of being printed on without the necessity of requiring any form of protective overcoating. It has overcome the objectionable tendency to transfer printed matter from "backside" to "faceside", on unrolling. The printed tape of this invention can function in a dual capacity as a packaging or holding tape as well as a printed identification or instructional message.

For future reference and clarity in understanding this invention, the film backing of the tape of this invention has two principal surfaces. The surface bearing the pressure-sensitive adhesive is referred to as the "faceside", while the surface bearing the printing ink, which is the low adhesion backsize surface, is referred to as the "backside". The term "low adhesive backsize compound" refers to a compound or compounds that constitute an ingredient of the low adhesion backsize coating. The term "low adhesion backsize coating" refers to the layer that contains both the low adhesion backsize compound and the ink adhesion promoter.

DETAILED DESCRIPTION

Polymeric film backings suitable for the tape of the present invention include oriented and unoriented polymeric materials, such as, for example, polyolefins, e.g., polypropylene; polyesters, e.g., polyethylene terephthalate; and polyvinyl chloride, e.g., unplasticized polyvinyl chloride. Although polypropylene bearing a low adhesion backsize coating generally presents difficult problems with respect to ink adhesion, the directly printable tape of the present invention can be made from a polypropylene backing with little difficulty. It is preferred that the polymeric film backing be oriented, either uniaxially or biaxially, because orientation conventionally provides increased strength to the tape. In the case of a packaging tape, biaxial orientation is preferred.

The present invention involves the proper selection of a binary component mixture to prepare a backsize coating which will allow direct printability and yet avoid the attendant problems previously noted. The first component of the mixture is at least one conventional low adhesion backsize compound, hereinafter alternatively referred to as an LAB. Representative examples of conventional low adhesion backsize compounds suitable for use in this invention are fully described in U.S. Pat. Nos. 2,607,711, 2,532,011, and 3,318,852, all of which are incorporated herein by reference.

For example, U.S. Pat. No. 2,607,711 describes LABs formed of a copolymer of an ester of the class consisting of higher alkyl acrylates and methacrylates wherein the higher alkyl radical has a length of at least 12 carbon atoms, and an acid of the class consisting of acrylic acid and methacrylic acid. The acrylic acid or methacrylic acid can be replaced in part by another copolymerizable ethylenic monomer, e.g., acrylonitrile or methacrylonitrile.

U.S. Pat. No. 3,318,852 describes LABs formed of a copolymer derived from an ethylenically unsaturated monomer containing a functional group forming a conjugated system with the ethylenic linkage wherein between about 10 and about 90 mole percent of the polymerized units of the copolymer contain a free carboxylic acid group as the functional group forming the conjugated system and all other functional groups forming the conjugated system are hydrolyzable to a free carboxyl acid group, and 20–90 percent by weight of monomeric units derived from an ethylenically unsaturated monomer containing a fluoroalkyl group of at least six carbon atoms. The solubility of the copolymer can be enhanced by the use of a third comonomer, also ethylenically unsaturated, containing a functional group which forms a conjugated system with its unsaturated bond and is hydrolyzable to a carboxyl group. Each of the monomers contributes to the overall properties of the copolymer.

U.S. Pat. No. 2,532,011 describes LABs comprising polyvinyl carbamate polymers wherein the carbamate side chains terminate with an alkyl group more than five carbon atoms in length, and preferably at least 14. These can be made by reacting polyvinyl alcohol with an appropriate isocyanate having a terminal alkyl group. An example is polyvinyl N-octadecyl carbamate, made by reacting polyvinyl alcohol and octadecyl isocyanate, which has 18 carbon atoms in the nitrogen-bonded side chain alkyl groups.

The ink adhesion promoter is selected from chlorinated polyolefins, e.g., chlorinated polyethylene, chlorinated polypropylene, chlorinated polybutylene, and mixtures thereof.

Representative examples of commercially available chlorinated polyolefins include Eastman ® CP-343-1, available from Eastman Chemical Products, Inc., and "Hardlen" 13-LP, available from Toyo Kasei Kogyo Co., Ltd.

The low adhesion backsize coating should contain at least about 10 percent by weight, and preferably from about 80 to about 90 percent by weight, of low adhesion backsize compound. This amount insures reasonableness in terms of the unwind force of the pressure-sensitive adhesive tape. The backsize coating should contain at least about 0.25 percent by weight chlorinated polyolefin, and preferably from about 10 to about 20 percent by weight. The amount of chlorinated polyolefin required to insure adequate ink adhesion depends on several factors, including the nature of the polymeric film backing, the nature of the adhesive, usage and storage conditions.

The coating thickness and weight of the low adhesion backsize coating are substantially the same as those described in U.S. Pat. No. 2,532,011. For example, the low adhesion backsize coating can be very thin, e.g. less than one-hundred-thousand of an inch thick, constituting a "molecular film" (i.e. a film which has a thickness of only a relatively few molecules). It has been found that coating weights of from about 0.2 to about 1.0 lb. per 1000 square yards of polymeric film backing give the results desired. Thicker coatings can be used if so desired.

Conventional pressure-sensitive adhesives can be used in the tape of this invention. A representative example of a suitable adhesive is described in U.S. Pat. No. 3,239,478, incorporated herein by reference.

The two components of the low adhesion backsize coating are typically combined in solution form. The resultant mixture is adjusted to a solids percentage depending on the particular coating method employed. The preferred solvents are toluene and xylene.

Either the low adhesion backsize compound solution or the chlorinated polyolefin solution can be charged to a mixing vessel and the other solution and any additional solvent can then be added to complete the blend. To insure homogeneity, the blend typically requires agitation prior to coating, in conventional fashion.

The backsize coating solutions described in this invention are generally coated onto the backside of the polymeric film backing prior to the coating of the pressure-sensitive adhesive to the faceside thereof. A conventional rotogravure roll coater can be used, which accurately meters the quantity of coating solution applied, and insures a uniform and continuous coating.

An ink found useful for printing on the backside of the tape of the present invention comprises a mixture of a conventional flexographic ink stock and a chlorinated polyolefin. The flexographic ink stock in general comprises coloring agents and liquid vehicles comprising solutions of suitable binders in solvents. A specific choice of binders and solvents depends on several factors, such as, for example, the nature of the coloring agents. The essence of the ink of this invention comprises incorporating a chlorinated polyolefin into such conventional inks. Suitable chlorinated polyolefins can be selected from the same group that are suitable as the ink adhesion promoter in the low adhesion backsize coating previously described. Examples of suitable commercially available chlorinated polyolefins include Eastman ® CP-343-1 and "Hardlen" 13-LP.

Solvent systems commonly employed in the manufacture of flexographic inks are the lower aliphatic alcohols, including propanol, isopropanol, ethanol and butanol; the lower aliphatic esters, in particular ethyl acetate; and the lower aliphatic ketones, in particular methl ethyl ketone. Additional solvent systems for flexographic inks are described in Kirk-Othmer Encyclopedia of Chemical Technology, 3rd ed. Vol. 13, John Wiley & Sons, Inc. (New York: 1981), p. 387. The amount and type of solvent are regulated so as to give the ink the desired drying speed and degree of penetration.

Binders for ink vehicles are commonly selected from rosin esters, synthetic film-forming polymers, polyamides, alkyd resins and proteins, including casein, gelatin and soy protein. The choice of binder depends upon the particular substrate used, each type of fibrous or film material having specific requirements for optimum adhesion, as is known to those of ordinary skill in the art.

Coloring agents can be organic or inorganic. Representative examples include dyes and pigments. The choice of suitable coloring agents is known to those of ordinary skill in the art.

In addition to the above-mentioned chief components, conventional flexographic inks customarily contain various amounts of modifying agents selected from waxes such as beeswax or paraffin wax, drying oils such as linseed oil, caster oil, turpentine oil, menhaden oil or the salts of linoleic acid, oleostearic acid and the like with amines such as triethanolamine or hydroxypropylamine, as well as small quantities of so-called drier like cobalt resinate, cobalt linoleate, or an aluminum soap of linseed or tung oil. The use of such modifying agents is a well-established art.

An effective amount of chlorinated polyolefin must be added to the ink composition to promote ink adhesion. An effective amount is generally at least about 0.25 weight percent of the ink composition. If too great a concentration of chlorinated polyolefin is incorporated in the ink, e.g. greater than 12 weight percent, the adhesive may pick off the backsize coating or adhesive may be transferred to the printed surface.

Preferably, the concentration of ingredients of the ink composition is as follows:

| Ingredient | Amount (Percent by weight) | Preferred amount (Percent by weight) |
| --- | --- | --- |
| Coloring agent | about 5 to about 15 | about 6 to about 7 |
| Resinous binder | about 15 to about 35 | about 15 to about 30 |
| Solvent | about 55 to about 75 | about 60 to about 70 |
| Chlorinated polyolefin | about 3 to about 12 | about 4 to about 5 |

The concentrations of coloring agent, resinous binder, and solvent can vary from the foregoing concentrations.

Other inks found suitable for printing on the backside of the tape of the present invention are described in assignee's U.S. Pat. Nos. 4,612,052 and 4,704,163, incorporated herein by reference. An exemplary ink composition, described in U.S. Pat. No. 4,612,052, contains the following ingredients in the amounts indicated (the percentages are percentages by weight):

| Ingredient | Amount (% of dry solids) | Amount (% of total) |
| --- | --- | --- |
| Dry solids: | | 41.6 |
| Binder (mixture of polyamide and nitrocellulose) | 48.9 | |
| Pigment | 19.0 | |
| Chlorinated polyolefin (Eastman ® CP 343-1) | 15.4 | |
| Wax | 1.3 | |
| Fatty acid amide (Armid ® HT, available from Armak Company) | 15.4 | |
| Solvent (mixture of methanol, ethanol, isopropanol, n-propanol, ethyl acetate, n-propyl acetate) | | 58.4 |

The third aspect involves the method of printing on the novel tape of this invention with the aforementioned inks.

The tape is subjected to a temperature sufficiently high to soften the low adhesion backsize coating, but not so high as to distort the polymeric backing or to degrade the adhesive. The ink is applied to the low adhesion backsize coating when it has reached this softened state. As used herein, the term "soften", "softened state", and the like refers to the condition of a solid that has reached its softening point, which point is defined as the temperature at which a solid flows (see Concise Chemical and Technical Dictionary, 3rd ed., Chemical Publishing Company, Inc. (New York: 1974), p. 961).

After the tape has been printed, it can be used immediately or rewound and stored for use at a later date. Rewinding of the printed tape is conducted under conventional conditions well known to those of ordinary skill in the art.

In the directly printable tapes of this invention, the printed ink remains anchored to the tape backside while the pressure-sensitive adhesive releases from the printed surface easily without "picking" or transferring of the printed matter to the pressure-sensitive adhesive, or transferring of the adhesive to the printed matter. Such can be accomplished without additional post printing treatment such as heat, pressure, radiation, or additional overcoating of a release-promoting layer.

EXAMPLE 1

A gravure roller consisting of a 200 line pyramidally knurled roll was utilized to apply the low adhesion backsize coatings at a machine speed of 20 yards/minute using solutions having a solids content of 5.8 percent. The coatings were then dried in an oven at 150° F.

for 1.5 minutes prior to winding the coated film in roll form.

These coating conditions resulted in backsize coatings which ranged in thickness from about 200 to about 800 nanometers.

The polymeric film backing utilized was corona treated biaxially oriented polypropylene. Film thicknesses ranged from 1 to 2 mils. The faceside of each film was then coated with a pressure-sensitive adhesive, a conventional block copolymer system similar to those described in U.S. Pat. No. 3,239,478. The pressure-sensitive adhesive was applied at coating weights of 17 to 30 grams per square meter.

The completed pressure-sensitive adhesive tape was in the form of a 12 inch wide roll which was slit to rolls of 2 inch width and 60 yard length for evaluation and testing.

Ink Removal Tests

A conventional flexographic printer, the SIAT L3 Printer, commercially available from Flexo Printing Equipment Corp., was used to print the backside of the test tape rolls. The inks utilized in the test procedure were "Flexotuf" Hard Blue 84LO569 or "Flexotuf" Hard Black 84LO863, available from the Inmont Corporation, modified by the addition of Eastman® CP 343-1 chlorinated polyolefin and Armid® HT fatty acid amide. The ink is fully described in Attorney's Docket No. 40527 USA 1A.

Printing was carried out at a machine speed of 100 yards/minute. The printed indicia covered 30 to 40 percent of the area of the tape backside. The tape was heated to approximately 200° F., at which temperature the low adhesion backsize coating was softened, and the ink was applied. Following printing, the tape was rewound in roll form for storage. The thus printed rolls were then aged at 120° F. for eleven days. The rolls of tape were unwound by hand at a rate consistent with normal tape application procedures. The quantity of ink removed was determined subjectively by visual observation, and tapes exhibiting no more than about 5 percent ink removal by this test were considered acceptable.

Unwind And Adhesion Tests of Printed Tape

Unwind forces were measured as the tape roll was unwound after printing. The adhesion test was performed by applying a length of the tape to a polished steel surface followed by removal therefrom.

Both of these tests are described in detail in the Seventh Edition of "Test Methods For Pressure Sensitive Tapes", copyright 1976, Pressure Sensitive Tape Council, Glenview, Illinois. The test for unwind force is designated PSTC-8, while the adhesion test is designated PSTC-1.

It is preferred for commercial purposes that unwind be 25 oz/in or lower. It is preferred that adhesion drop be 15% or lower.

Backsize coating composition A containing the components set forth in Table I was prepared in the following manner. The LAB (19.2 g) was dissolved in xylene (364.6 g) and the chlorinated polyolefin (4.0 g) was dissolved in toluene (12.0 g). The LAB solution was charged to a one-quart jar, and then the chlorinated polyolefin solution was charged. The blend was stirred to bring about homogeneity. Backsize coating compositions B-F were prepared in the same manner as backsize coating composition A, the only exceptions being the relative amounts of chlorinated polyolefin and LAB present in the coating solutions. Backsize coating composition G did not contain a chlorinated polyolefin. The compositions were applied to films as set forth in Table II according to the general coating procedure previously described and the coated film dried at a temperature of 150° F.

TABLE I

|  | Backsize coating composition (parts by weight, dry solids) | | | | | | |
|---|---|---|---|---|---|---|---|
| Components | A | B | C | D | E | F | G |
| Chlorinated polyolefin[1] | 5 | 10 | 15 | 17 | 40 | 56 | 0 |
| LAB[2] | 95 | 90 | 85 | 83 | 60 | 44 | 100 |

[1]Eastman ® CP 343-1
[2]Polyvinyl N-octadecyl carbamate as described in U.S. Pat. No. 2,532,011.

The opposite surface of the film was coated with the adhesive previously described.

The tapes were slit to about two inches in width and printed in the manner previously described. The printed tapes were wound into rolls and some were retained for 11 days at 120° F. The tapes were measured for adhesion, unwind force, and observed for ink transfer, with the results shown in Table II.

TABLE II

| | | | Properties Initially after printing | | 120° F. aged | | |
|---|---|---|---|---|---|---|---|
| Film[1] | Backsize composition[2] | Flexographic Ink[3] | Unwind[4] | Ink transfer[5] | Unwind[4] | Ink transfer[5] | Percentage drop in adhesion |
| Polypropylene | A | Ink I | low | none | low | none | 10 |
| Polypropylene | B | Ink I | low | none | low | none | 10 |
| Polypropylene | C | Ink I | low | none | low | very slight | 10 |
| Polypropylene | D | Ink I | low | none | medium | slight | 10 |
| Polypropylene | E | Ink I | medium-high | none | high | medium | 10 |
| Polypropylene | F | Ink I | medium-high | none | high | medium | 10 |
| Polypropylene | G | Ink II | medium-high | medium | high | high | 0 |
| Polypropylene | A | Ink III | low | none | low | none | 15 |
| Polypropylene | B | Ink III | low | none | low | none | 15 |
| Polypropylene | C | Ink III | low | none | low | none | 15 |
| Polypropylene | D | Ink III | low | none | low | none | 15 |
| Polypropylene | E | Ink III | medium | none | medium | slight | 15 |

TABLE II-continued

| Film[1] | Backsize composition[2] | Flexographic Ink[3] | Properties Initially after printing | | 120° F. aged | | Percentage drop in adhesion |
| --- | --- | --- | --- | --- | --- | --- | --- |
| | | | Unwind[4] | Ink transfer[5] | Unwind[4] | Ink transfer[5] | |
| Polypropylene | F | Ink III | medium-high | none | medium | slight | 15 |

[1]All films were corona treated biaxially oriental polypropylene.
[2]The letters A–G refer to composition in Table I.
[3]Ink I was a composition containing "Flexotuf" Hard Black 84LO863 ink stock (76.9 wt. percent dry solids), Eastman ® CP 343-1 chlorinated polyolefin (11.6 wt. percent dry solids), Armid ® HT fatty acid amide (11.6 wt. percent dry solids). Ink II was a composition of "Flexotuf" Hard Blue 84LO569 ink stock. Ink III was a composition containing "Flexotuf" Hard Blue 84LO569 ink stock (69.6 wt. percent dry solids), Eastman ® CP 343-1 chlorinated polyolefin (15.2 wt. percent dry solids), and Armid ® HT fatty acid amide (15.2 wt. percent dry solids).
[4]Low means 7 to 12 oz/in; medium means 13 to 18 oz/in; high means 18 to 25 oz/in.
[5]None means no ink transfer; slight means 0 to 2½% ink transfer; medium means 2½ to 5% ink transfer; high means greater than 5% ink transfer.

The data in the foregoing table show that tape having a low adhesion backsize coating wherein the concentration of chlorinated polyolefin ranges from 5 percent by weight to 17 percent by weight provides good unwind and ink transfer properties, while not adversely affecting adhesion properties to an unacceptable extent.

The identical release compositions and adhesives used in Example 1 can be applied to a biaxially oriented polyethylene terephthalate backing (thickness of 1 to 2 mils) in the manner described in Example 1. Upon being tested under the same conditions as in Example 1, the results will be substantially similar to those of Example 1.

Example 2

An ink composition was prepared by adding 1.19 grams of chlorinated polyolefin (Eastman ® CP 343-1) to 20.0 grams of Rotoflo OPQ Red B758700 75LO555, a commercially available flexographic ink composition manufactured by Inmont Corporation.

This ink was used to print on the same types of tape as described in Example 1 under the same printing conditions as described in Example 1. Upon being tested under the same conditions as in Example 1, the results were substantially similar to those of Example 1.

Various modifications and alterations of this invention will become apparent to those skilled in the art without departing from the scope and spirit of this invention, and it should be understood that this invention is not to be unduly limited to the embodiments set forth herein.

What is claimed is:

1. An ink composition comprising a resinous binder comprising a polyamide, a coloring agent, a chlorinated polyolefin, and a solvent, wherein said chlorinated polyolefin comprises from about 3 to about 12 weight percent of said composition.

2. A composition of claim 1 wherein said chlorinated polyolefin comprises from about 4 to about 7 weight percent of said composition.

3. The composition of claim 1 wherein said resinous binder comprises about 15 to about 35 weight percent of said composition, said coloring agent comprises from about 5 to about 15 weight percent of said composition, said chlorinated polyolefin comprises from about 3 to about 12 weight percent of said composition, and said solvent comprises from about 55 to about 75 weight percent of said composition.

4. The composition of claim 1 wherein said resinous binder comprises from about 15 to about 30 weight percent of said composition, said coloring agent comprises from about 6 to about 7 weight percent of said composition, said chlorinated polyolefin comprises from about 4 to about 5 weight percent of said composition, and said solvent comprises from about 60 to about 70 weight percent of said composition.

* * * * *